(12) United States Patent
Yamada et al.

(10) Patent No.: US 8,753,471 B2
(45) Date of Patent: Jun. 17, 2014

(54) VACUUM HEAT INSULATING MATERIAL, METHOD OF PRODUCING VACUUM HEAT INSULATING MATERIAL, AND HEAT INSULATING BOX BODY USING VACUUM HEAT INSULATING MATERIAL

(75) Inventors: Muneto Yamada, Osaka (JP); Kazuo Hashimoto, Shiga (JP); Hiroaki Katsumura, Osaka (JP); Kiyoshi Kinoshita, Shiga (JP)

(73) Assignee: Panasonic Corporation, Osaka (JP)

( * ) Notice: Subject to any disclaimer, the term of this patent is extended or adjusted under 35 U.S.C. 154(b) by 192 days.

(21) Appl. No.: 12/698,426

(22) Filed: Feb. 2, 2010

(65) Prior Publication Data

US 2011/0030892 A1    Feb. 10, 2011

Related U.S. Application Data

(63) Continuation of application No. 11/719,653, filed as application No. PCT/JP2005/022339 on Dec. 6, 2005, now abandoned.

(30) Foreign Application Priority Data

Dec. 7, 2004 (JP) ................. 2004-353901

(51) Int. Cl.
| | |
|---|---|
| B29C 65/00 | (2006.01) |
| B32B 37/00 | (2006.01) |
| B30B 5/02 | (2006.01) |
| B30B 5/04 | (2006.01) |
| B30B 15/34 | (2006.01) |
| B32B 17/00 | (2006.01) |
| C03C 27/00 | (2006.01) |
| B65C 9/25 | (2006.01) |
| C09J 5/00 | (2006.01) |
| B32B 1/04 | (2006.01) |
| B32B 3/02 | (2006.01) |
| A61F 13/15 | (2006.01) |
| B32B 27/32 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |

(52) U.S. Cl.
USPC ........ 156/285; 156/286; 156/382; 156/583.3; 156/104; 156/102; 156/323; 156/103; 156/105; 156/106; 428/69; 428/74; 428/75; 428/76; 428/219; 428/220; 428/403

(58) Field of Classification Search
USPC .............. 156/286, 285, 382, 583.3, 104, 102, 156/323, 103, 105, 106; 428/69, 74, 75, 76, 428/219, 220, 303, 302
See application file for complete search history.

(56) References Cited

U.S. PATENT DOCUMENTS 3,997,385 A * 12/1976 Osborne .................... 156/272.8
4,726,974 A *  2/1988 Nowobilski et al. ............ 428/69

(Continued)

FOREIGN PATENT DOCUMENTS

| JP | 52-82586 | 7/1977 |
|---|---|---|
| JP | 63-187084 A | 8/1988 |

(Continued)

OTHER PUBLICATIONS

International Search Report for Application PCT/JP2005/022339, Mar. 28, 2006.

Primary Examiner — Katarzyna Wyrozebski Lee
Assistant Examiner — Matthew Hoover
(74) Attorney, Agent, or Firm — RatnerPrestia

(57) ABSTRACT

Disclosed is a vacuum heat insulating material. Also disclosed is a heat insulating box using the vacuum heat insulating material. The vacuum heat insulating material includes a core member and envelope members having gas-barrier properties and including heat-seal layers. The envelope members are opposed to each other in such a manner that the core member is disposed between the heat-seal layers. The envelope members are entirely heated to a temperature at which the heat-seal layers are melted, and the heat-seal layers are heat sealed to each other by applying uniform pressure to the entire envelope members from outside to inside the envelope members.

19 Claims, 6 Drawing Sheets

(56) References Cited

U.S. PATENT DOCUMENTS

| | | | |
|---|---|---|---|
| 6,001,450 A | 12/1999 | Tanimoto et al. | |
| 6,942,751 B1 * | 9/2005 | George | 156/286 |
| 7,833,605 B2 | 11/2010 | Tenra et al. | |
| 2005/0175799 A1 * | 8/2005 | Farnworth | 428/34.1 |
| 2006/0024469 A1 * | 2/2006 | Tenra et al. | 428/69 |
| 2006/0263571 A1 | 11/2006 | Tsunetsugu et al. | |

FOREIGN PATENT DOCUMENTS

| | | | |
|---|---|---|---|
| JP | 2000-104889 A | 4/2000 |
| JP | 2000-108255 A | 4/2000 |
| JP | 2000-249290 A | 9/2000 |
| JP | 2003-74785 A | 3/2003 |
| JP | 2004-197935 A | 7/2004 |
| JP | 2004-197935 A | 7/2004 |
| JP | 2004197935 A * | 7/2004 |
| JP | 2004-239300 A | 8/2004 |
| JP | 2004-251303 A | 9/2004 |
| JP | 2004-340194 A | 12/2004 |
| JP | 2004-353901 | 10/2010 |
| WO | WO 2004/094891 A1 | 11/2004 |

* cited by examiner

VACUUM HEAT INSULATING MATERIAL, METHOD OF PRODUCING VACUUM HEAT INSULATING MATERIAL, AND HEAT INSULATING BOX BODY USING VACUUM HEAT INSULATING MATERIAL

This application is a continuation of U.S. patent application Ser. No. 11/719,653, filed May 18, 2007, which is a U.S. National Phase Application of PCT International Application PCT/JP2005/022339, the contents of which are incorporated herein by reference.

TECHNICAL FIELD

The present invention relates to a vacuum heat insulating material, a method of producing the vacuum heat insulating material, and a heat insulating box such as a refrigerator, which uses the vacuum heat insulating material.

BACKGROUND ART

With increasing concern over the protection of global environment in recent years, energy saving in household electrical appliances has become an urgent issue. One proposed solution to this problem is to use vacuum heat insulating materials in order to eliminate unnecessary heat transfer.

A vacuum heat insulating material is formed of a core member and envelope members which cover the core member. The core member is made of foamed resin, fibrous material, or the like. The vacuum heat insulating material is vacuum-sealed to lower thermal conductivity of gas. The insulation performance can be maintained only by maintaining the vacuum heat insulating material in a vacuum environment. During a long period of operation, however, gases such as air and water vapor may enter into the vacuum heat insulating material through resin layers, which are heat sealed to each other at the edges of the envelope members. This gradually deteriorates the degree of vacuum and hence the insulation performance.

Japanese Patent Unexamined Publication No. 2000-104889 shows a method of producing a vacuum heat insulating material that prevents the deterioration of the vacuum due to the entry of gas or water from outside.

FIG. 9 shows a sectional view of the conventional vacuum heat insulating material. FIG. 10 shows a sectional view of an envelope member of the conventional vacuum heat insulating material. As shown in FIGS. 9 and 10, vacuum heat insulating material 1 is formed of core member 2 and a bag-like envelope consisting of top envelope member 3a and bottom envelope member 3b larger than top envelope member 3a and protruding at an edge. The bag-like envelope is sealed at edge-seal portion 4 and folded portion 5 thereof by using an adhesive layer so as to be maintained in a vacuum. In folded portion 5, one end of bottom wrapper 3b that is protruded from top wrapper 3a is folded back so as to have two stacked sealing layers.

Each of top and bottom envelope members 3a and 3b is formed of top heat seal layer 7 and bottom heat seal layer 8 with aluminum foil layer 6 disposed therebetween. Aluminum foil layer 6 has gas-barrier properties. Top heat seal layer 7 and bottom heat seal layer 8 are made of high-density polyethylene. Bottom heat seal layer 8 and top heat seal layer 7 of top envelope member 3a are sandwiched between two bottom envelope members 3b so as to form folded portion 5. Folded portion 5 is heat sealed to form inner sealing layer 9 and outer sealing layer 10.

The inner sealing layer is prevented from being exposed outside so as to suppress the deterioration of the vacuum of the envelope. As a result, the vacuum heat insulating material can maintain the insulation performance.

Japanese Patent Unexamined Publication No. 2004-197935 shows a method of producing a vacuum heat insulating material as follows: A planar core member is disposed between the respective heat-seal layers of two opposed envelope members having gas-barrier properties. Then, the envelope members, including a portion having the core member disposed therebetween, are pressed under reduced pressure between hot plates made of an elastic body so that the opposed heat-seal layers are heat sealed along the shape of the core member. This method allows the heat-seal layers to have a larger width in the peripheries of the core member. This suppresses the deterioration of the vacuum in the envelope members, thereby maintaining the insulation performance of the vacuum heat insulating material.

It is, however, difficult from a manufacturing standpoint to heat seal folded portion 5 in such a manner as to have two sealing layers: inner sealing layer 9 and outer sealing layer 10 as in the above conventional structure. This may cause wrinkles or sealing defects.

As another problem, top and bottom heat seal layers 7 and 8, which are sealed between inner and outer sealing layers 9 and 10, are required to be made of a material suitable for heat sealing, thereby narrowing the range of materials suitable for surface protection. For example, high-density polyethylene is suitable for heat sealing, but is not for surface protection due to its low strength properties, especially scratch resistance and pierce resistance. As a result, the vacuum heat insulating material may have pinholes when handled inappropriately after its manufacture.

On the other hand, in the method shown in Japanese Patent Unexamined Publication No. 2004-197935, the envelope members, including the portion having the core member disposed therebetween, are heat sealed by being pressed between the hot plates made of an elastic body. The pressure of the hot plates can be effectively applied to the portion of the envelope members that has the core member disposed therebetween, but not to the portions of the envelope members that do not have the core member therebetween. Therefore, the core member needs to be compressible to a thickness of not more than several millimeters. Using a core member having a comparative large thickness may cause the portions of the envelope members that do not have the core member therebetween to be pressed insufficiently, thereby causing defective heat sealing.

If the load of the hot plates is increased in order to apply sufficient pressure to the portions of the envelope members that do not have the core member therebetween, the core member may be compressed too much. As a result, the core member becomes to have a larger solid thermal conductivity, thereby degrading the insulation performance of the vacuum heat insulating material. Moreover, it is difficult to control the pressure applied to the portions of the envelope members that do not have the core member therebetween, that is, the portions where the envelope members are to be heat sealed to each other. This is because the pressure tends to depend on the flexibility and elasticity of the hot plates and the shape and thickness of the core member.

SUMMARY OF THE INVENTION

The present invention provides a vacuum heat insulating material which is unsusceptible to wrinkles, sealing defects, pinholes, and other similar problems, and has high resistance to scratch and pierce. The invention also provides a heat insulating box such as a refrigerator using this vacuum heat insulating material in order to achieve energy-saving.

The vacuum heat insulating material of the present invention includes a core member and envelope members having gas-barrier properties and each including a heat-seal layer, the envelope members are opposed to each other in such a manner that the core member is disposed between the heat-seal layers. The entire envelope members are heated to a temperature at which the heat-seal layers are melted; and the heat-seal layers are heat sealed to each other by applying uniform pressure from outside to inside the envelope members at least to a first portion of the envelope members that faces the core member, and a second portion of the envelope members that is in a vicinity of the core member.

In this structure, even if the core member has a comparative large thickness, the seal width to be heat sealed is extended as far as the edges of the core member. This makes it unnecessary to fold back the heat-seal layers when the envelope members are sealed by heat sealing. Consequently, the heat sealing can be performed as simply as the conventional well-known heat sealing without causing wrinkles or sealing defects.

Figure 1:
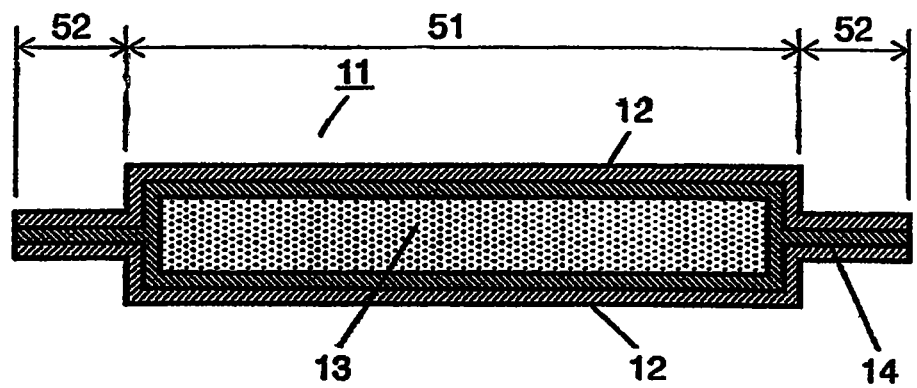
FIG. 1 shows a sectional view of a vacuum heat insulating material according to a first embodiment of the present invention.

REFERENCE MARKS IN THE DRAWINGS 11, 19, 22 vacuum heat insulating material
12, 12a, 12b, 23 envelope member
13, 24 core member
14, 14a, 14b heat-seal layer
26 sealing portion
27 secured sealing portion
28 first protective layer
30 gas barrier layer
32 reduced pressure space
35 refrigerator (heat insulating box)
36 outer box
37 inner box
38 foam insulation material
51, 55 first portion
52, 56 second portion
53, 57 third portion

DETAILED DESCRIPTION OF PREFERRED EMBODIMENTS

The vacuum heat insulating material of the present invention includes a core member and envelope members having gas-barrier properties. The envelope members each include a heat-seal layer and are opposed to each other in such a manner that the core member is disposed between the heat-seal layers. The heat-seal layers are heat sealed to each other by heating the entire envelope members to a temperature at which the heat-seal layers are melted and by applying uniform pressure from outside to inside the envelope members throughout a first portion of the envelope members that at least faces the core member and a second portion of the envelope members that is in a vicinity of the core member.

As described above, the opposed heat-seal layers are heat sealed to each other by entirely heating the envelope members to the temperature at which the heat-seal layers are melted and by applying the uniform pressure from outside to inside the envelope members throughout the first portion and the second portions of the envelope members. Consequently, even when the core member has a comparatively large thickness such as larger than 10 millimeters, the predetermined pressure can be applied to the portions of the envelope members that do not have the core member therebetween, without compressing the core member too much. The aforementioned portions are the portions where the heat-seal layers are to be heat sealed to each other. This ensures the heat sealing.

Consequently, even when the core member has a comparative large thickness, the vacuum heat insulating material is prevented from suffering winkles in the vicinity of the core member, so that the whole portions where the envelope members are in contact with each other under the atmospheric pressure can be securely heat sealed. The heat sealed portion can extend the region as far as the edges of the core member so as to improve sealing performance. The heat sealed portions where the opposed heat-seal layers are heat sealed to each other can have homogeneous quality and reliability. As a result, the vacuum heat insulating material having long-term reliability can be provided.

In the vacuum heat insulating material of the present invention, the core member may be sealed under reduced pressure between the envelope members. The opposed heat-seal layers are heat sealed to each other by heating the entire envelope members to the temperature at which the heat-seal layers are melted and by applying the uniform pressure from outside to inside the envelope members to the entire envelope members. Consequently, even when the core member has a comparatively large thickness exceeding 10 millimeters, the predetermined pressure can be applied to the portions of the envelope members that do not have the core member therebetween, without compressing the core member too much. The aforementioned portions means the portions where the envelope members are to be heat sealed to each other. This ensures the heat sealing.

Consequently, even when the core member has a comparative large thickness, the vacuum heat insulating material is prevented from producing winkles in the vicinity of the core member, so that the portions where the envelope members are in contact with each other under the atmospheric pressure can be securely heat sealed. The heat sealed portion can extend the region as far as the edges of the core member so as to improve sealing performance. The heat sealed portion where the opposed heat-seal layers are heat sealed to each other can have homogeneous quality and reliability. As a result, the vacuum heat insulating material having long-term reliability can be provided.

The vacuum heat insulating material of the present invention may have inside the envelope members reduced in pressure in order to previously heat seal third portions thereof which are outside the second portions thereof. This allows the heat sealing to be performed as simply as the normal well-known heat sealing without suffering wrinkles or sealing defects. Furthermore, the heat-sealing can be applied to the portions where the envelope members used to be merely in contact with each other and not sealed to each other. This extends the region to be heat sealed so as to improve sealing performance. As a result, the vacuum heat insulating material having long-term reliability can be provided.

In the vacuum heat insulating material of the present invention, the pressure may be applied by a fluid. Using a fluid facilitates the application of the uniform pressure to the entire envelope members. The pressure may be applied by the fluid directly to the envelope members. This prevents the envelope members from being stressed or scratched, making the vacuum heat insulating material with less pinholes and other similar problems.

In the vacuum heat insulating material of the present invention, the fluid may be a gas. A gas is easier to handle and has less adverse effects on the envelope members than a liquid, which requires after-treatment such as removal of the liquid from the envelope members when adhered thereto. Furthermore, the pressure can be atmospheric pressure. The atmospheric pressure can be uniformly applied from outside to inside the envelope members to the entire envelope members only by covering the core member with the envelope members in a space reduced in pressure substantially to vacuum and then returning the reduced in pressure space to normal pressure. The atmospheric pressure is high enough to apply at the heat sealing the envelope members, so that there is no need to provide a pressuring device. This simplifies the provision of the vacuum heat insulating material.

In the vacuum heat insulating material of the present invention, the heat-seal layers may be polyethylene. Since polyethylene can be sealed at comparatively low temperatures, it becomes easier to perform the heat sealing by additional heating. As a result, the vacuum heat insulating material can be provided at low cost. Furthermore, the envelope member may have a protective layer of polyethylene terephthalate as the outermost layer. Providing the envelope members with the outermost layers made of a material suitable for surface protection can make the envelope members more resistant to scratch and pierce and prevents an occurrence of pinholes and other similar problems. As a result, the vacuum heat insulating material having long-term reliability can be provided. Polyethylene terephthalate is inexpensive, so that the vacuum heat insulating material of the present invention can be provided at low cost.

A method of producing a vacuum heat insulating material according to the present invention is performed as follows: The core member is covered with envelope members having a gas barrier layers and a heat-seal layers. Inside of the envelope members are reduced in pressure, the peripheries of the envelope members are heat sealed, and non-sealed portions inside the peripheries are heat sealed by uniformly applying heat to melt the heat-seal layers. The non-sealed portions mean the portions where the envelope members are merely in contact with each other and not sealed to each other. This method allows to heat seal the non-sealed portions of the envelope members that cannot be heat sealed by the ordinary method. In the vacuum heat insulating material thus produced, the portions of the heat-seal layers that are in contact with each other are entirely heat sealed to each other.

In the method of producing a vacuum heat insulating material of the present invention, the heat may be applied out of contact with the envelope members. This allows the envelope members to be heated without the hot plates or the like that fit the shape of the core member. In addition, the envelope members have no stress according to creases or scratches and an occurrence of pinholes and other similar problems can be prevented. Alternatively, the heat may be applied by radiant heat from a heater. This allows the envelope members to be heated out of contact with the heater and also in a reduced pressure space.

Another method of producing a vacuum heat insulating material according to the present invention is as follows:

The core member is covered with envelope members having gas barrier layers and a heat-seal layers in a reduced pressure space. The heat-seal layers are brought to a predetermined molten state while the reduced pressure space is maintained at a temperature higher than the melting point of the heat-seal layers. The reduced pressure space is then returned to normal pressure, while pressing the peripheries of the envelope members, and the envelope members including the non-pressed portions can be heat sealed to each other. This method allows the envelope members to be normally heat sealed by heat pressing and to be heat sealed by using the atmospheric pressure at the same time, so that it takes less time to produce the vacuum heat insulating material.

The heat insulating box of the present invention includes an outer box, an inner box, a foam insulation material filled in a space formed by the outer box and the inner box, and a vacuum heat insulating material provided between the outer box and the inner box. The vacuum heat insulating material is at least partly buried in the foam insulation material. The vacuum heat insulating material is one of the aforementioned vacuum heat insulating materials or produced by one of the aforementioned methods of producing a vacuum heat insulating material. The heat insulating box can maintain heat insulating performance for a long time because of the vacuum heat insulating material having long-term reliability. The heat insulating box can be applied, for example, to a refrigerator to allow it to maintain energy saving performance for a long time.

Embodiments of the present invention will be described as follows with reference to drawings. Note that the present invention is not limited to these embodiments.

First Embodiment

Figure 2:
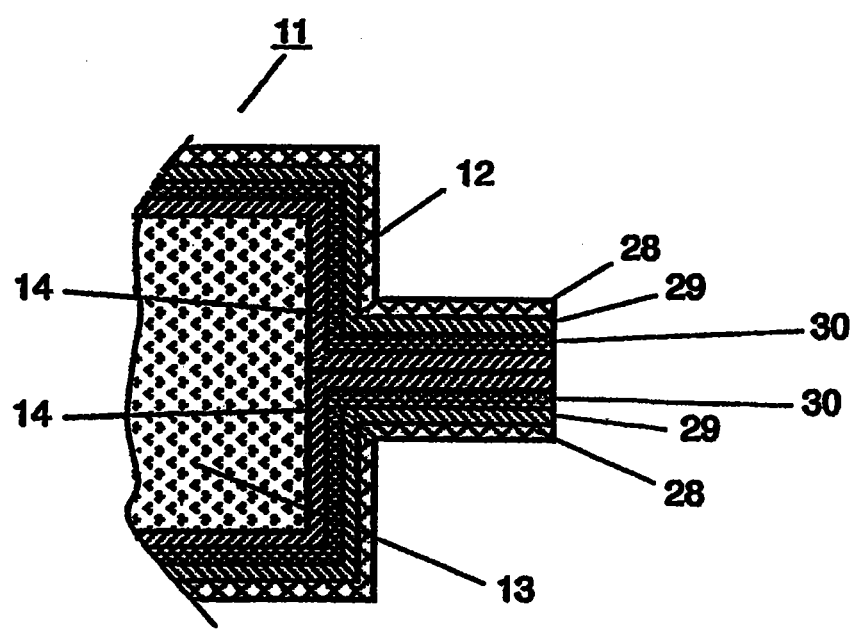
FIG. 2 is an enlarged sectional view of an essential part of the vacuum heat insulating material according to the first embodiment of the present invention, showing a peripheral potion of the vacuum heat insulating material.
Figure 3:
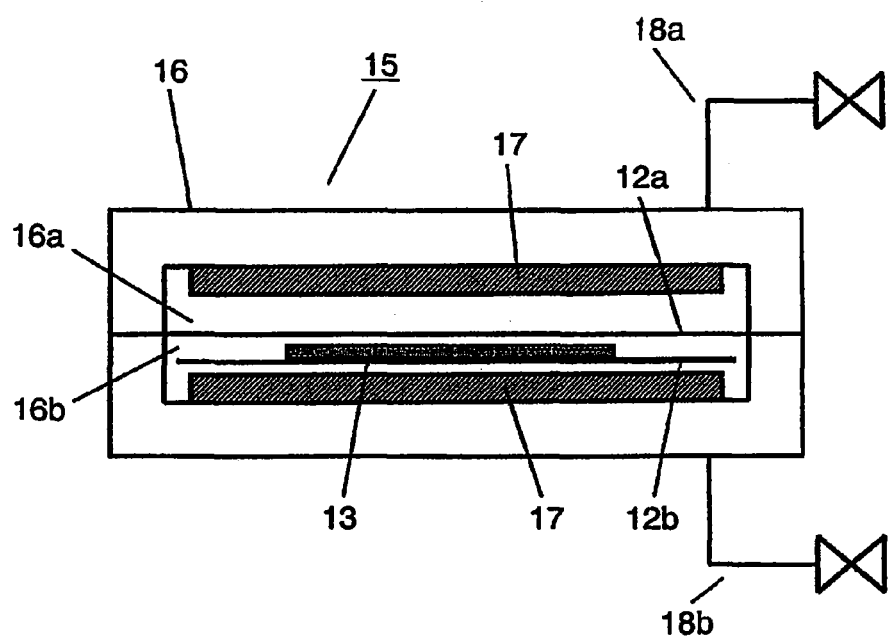
FIG. 3 shows a schematic sectional view of a production device for producing the vacuum heat insulating material according to the first embodiment of the present invention.

FIG. 1 shows a sectional view of a vacuum heat insulating material according to a first embodiment of the present invention. FIG. 2 is an enlarged sectional view of an essential part of the vacuum heat insulating material according to the present embodiment. FIG. 3 is a schematic sectional view of a production device for producing the vacuum heat insulating material according to the present embodiment. In FIG. 1, vacuum heat insulating material 11 has core member 13 and two envelope members 12 which cover core member 13 and inside of the envelope members 12 is vacuum-sealed. Envelope members 12 have first portion 51 which faces the core member and second portions 52 which are in the vicinity of the core member. First portion 51 and second portions 52 are unitary formed.

Envelope member 12 includes heat-seal layer 14. The two heat-seal layer 14 of upper and bottom envelope members 12 are heat sealed along core member 13 and integrally heat sealed to each other as far as the edges of core member 13. Thickness of heat-seal layers 14 have is maintained constant. Core member 13 is a glass wool board having a density of 275 kg/m$^3$ dried for one hour at 140° C. in a drying furnace. Core member 13 may be a planar porous body having a gas phase ratio of about 90%. The porous body may be made of any well known industrially usable material in the form of powder, foam, fiber, or the like, depending on the application or required characteristics.

In FIG. 2, envelope member 12 is made of a laminate film consisting of first protective layer 28, second protective layer 29, gas barrier layer 30, and heat-seal layer 14 in this order from outside to inside.

These two laminate films are opposite to each other. First protective layers 28 are made of polyethylene terephthalate film, and second protective layers 29 are made of nylon film. Gas barrier layers 30 are made of aluminum foil, and heat-seal layers 14 are made of very low density polyethylene (VLDPE) film, which is a kind of polyethylene. The polyethylene terephthalate film is 12 μm thick, the nylon film is 15 μm thick, the aluminum foil is 6 μm thick, and the very low density polyethylene (VLDPE) film is 50 μm thick.

Envelope members 12 are preferably about 0.1 mm thick to prevent wrinkles and sealing defects and to improve sealing quality. Envelope members 12 are preferably made of plastic laminate film having gas-barrier properties. Envelope members 12 can also preferably be elongated and bent depending on the shape or size of core member 13 during the production of vacuum heat insulating material 11 as far as the gas-barrier properties are not affected.

Vacuum heat insulating material 11 is produced by using production device 15 shown in FIG. 3. Production device 15 has two hot plates 17 at top and bottom in chamber 16 and is connected to pipes 18a and 18b at top and bottom of chamber 16. Pipes 18a and 18b are used to create the vacuum so as to increase the degree of vacuum, and to release the vacuum so as to decrease the degree of vacuum.

Envelope members 12a and 12b and core member 13 are placed in production device 15. Chamber 16 is divided into two spaces 16a and 16b by envelope members 12a. Envelope members 12 are heated by top and bottom hot plates 17 to the melting point of heat-seal layers 14, and entire chamber 16 is evacuated through pipes 18a and 18b. When chamber 16 reaches a predetermined degree of vacuum, pipe 18a releases the vacuum only in chamber 16a first, and then releases the vacuum in chamber 16b so as to introduce the atmosphere. Such a control of atmospheric introduction improves sealing quality.

Hot plates 17 only need to be heated to make heat-seal layers 14 of envelope members 12 not less than their melting point at least when the vacuum is released. It is idealistic to heat envelope members 12 only during the atmospheric introduction so as to reduce the heat load of the envelope members.

The introduced atmosphere makes chamber 16a have a higher pressure than chamber 16b. The difference in pressure between chamber 16a and chamber 16b brings envelope members 12a into contact with envelope members 12b, thereby being heat sealed along core member 13. Envelope members 12a is larger in size than envelope members 12b, and the outer peripheral edges of envelope members 12a are held by chamber 16 without being heat sealed to envelope members 12b. After the heat sealing between envelope members 12a and 12b, the outer peripheral edges, which have not been heat sealed, are cut off.

As described above, in vacuum heat insulating material 11, opposed heat-seal layers 14 are heat sealed along core member 13 by utilizing the gas pressure such as atmospheric pressure due to the pressure difference in chamber 16. Envelope members 12 are pressed uniformly throughout the surfaces thereof so as to be heat sealed along core member 13 without causing wrinkles or sealing defects. This extends the region to be heat sealed so as to improve the sealing performance. As a result, the vacuum heat insulating material having long-term reliability can be provided.

The aforementioned processes are performed in a single chamber so as to improve the production efficiency of the vacuum heat insulating material. In vacuum heat insulating material 11 according to the present embodiment, the heat sealed portions where opposed heat-seal layers 14 of the envelope members 12 are heat sealed to each other have a uniform thickness. This allows vacuum heat insulating material 11 to have homogeneous sealing performance and also a smooth surface, which makes a good appearance.

In vacuum heat insulating material 11 of the present embodiment, core member 13 is disposed between heat-seal layers 14 of envelope members 12 having gas-barrier properties. Opposed heat-seal layers 14 are heat sealed to each other by heating entire envelope members 12 to the temperature at which heat-seal layers 14 are melted and by applying the uniform pressure from outside to inside envelope members 12 throughout first portion 51 of envelope members 12 that faces at least core member 13 and second portions 52 of envelope members 12 that are in the vicinity of core member 13.

In vacuum heat insulating material 11 of the present embodiment, core member 13 is sealed under reduced pressure between heat-seal layers 14 of envelope members 12 having gas-barrier properties.

Opposed heat-seal layers 14 are heat sealed to each other by heating entire envelope members 12 to the temperature at which heat-seal layers 14 are melted and by applying the uniform pressure from outside to inside envelope members 12 to the entire envelope members 12.

In vacuum heat insulating material 11 of the present embodiment that has the aforementioned structure, opposed heat-seal layers 14 are heat sealed to each other by heating entire envelope members 12 to the temperature at which heat-seal layers 14 are melted and by applying the uniform pressure from outside to inside envelope members 12 throughout first portion 51 and second portions 52 of envelope members 12. Consequently, even when core member 13 has a comparatively large thickness exceeding 10 millimeters, the predetermined pressure can be applied to the portions of envelope members 12 that do not have core member 13 therebetween without compressing core member 13 too much. The aforementioned portions mean where heat-seal layers 14 are to be heat sealed to each other. This ensures the heat sealing.

Consequently, even when core member 13 has a comparative large thickness, vacuum heat insulating material 11 is prevented from suffering winkles in the vicinity of core member 13, and the portions where envelope members 12 are in contact with each other can be securely heat sealed by the atmospheric pressure. The region to be heat sealed can be extended as far as the edges of core member 13 so as to improve sealing performance. The heat sealed portions where opposed heat-seal layers 14 are heat sealed to each other have homogeneous quality and reliability. As a result, vacuum heat insulating material 11 having long-term reliability can be provided.

In the present embodiment, the pressure applied for the heat sealing is a fluid pressure. Using a fluid facilitates the application of the uniform pressure to the entire envelope members 12. The pressure for the heat sealing in the present embodiment is directly applied by the fluid, without stressing or scratching envelope members 12. As a result, vacuum heat insulating material 11 with less occurrence of pinholes and other similar problems can be provided.

In the present embodiment, the fluid is a gas. A gas is easier to handle and has less adverse effects on envelope members 12 than a liquid, which requires after-treatment such as removal of the liquid from envelope members 12 when adhered thereto. The pressure applied by the gas in the present embodiment is atmospheric pressure. The atmospheric pressure can be uniformly applied from outside to inside envelope members 12 to the entire envelope members 12 only by covering core member 13 with envelope members 12 in a space reduced in pressure substantially to vacuum and then returning the reduced pressure space to normal pressure. The atmospheric pressure is high enough for the heat-sealing, so that there is no need to provide a pressure device. This simplifies the provision of vacuum heat insulating material 11.

Heat-seal layers 14 are made of polyethylene. Since polyethylene can be sealed at comparatively low temperatures, it becomes easier to perform the heat sealing by additional heating. As a result, vacuum heat insulating material 11 can be provided at low cost. Furthermore, envelope members 12 each have protective layer 28 of polyethylene terephthalate as the outermost layer. Providing envelope members 12 with the outermost layers made of a material suitable for surface protection can make envelope members 12 more resistant to scratch and pierce and occurrence of pinholes and other similar problems can be prevented. As a result, vacuum heat insulating material 11 having long-term reliability can be provided. Polyethylene terephthalate is inexpensive, so that vacuum heat insulating material 11 can be provided at low cost.

In the case where the heat for the heat sealing is applied out of contact with envelope members 12, there is no need to use the hot plates or the like that fit the shape of core member 13. In addition, envelope members 12 have no stress due to creases or scratches and occurrence of pinholes and other similar problems can be prevented. In the case where the heat for the heat sealing is applied by radiant heat from hot plates 17, envelope members 12 can be heated out of contact with hot plates 17 and also in a reduced pressure space. Although vacuum heat insulating material 11 of the present embodiment does not include absorbent, it can include it.

Second Embodiment

Figure 4:
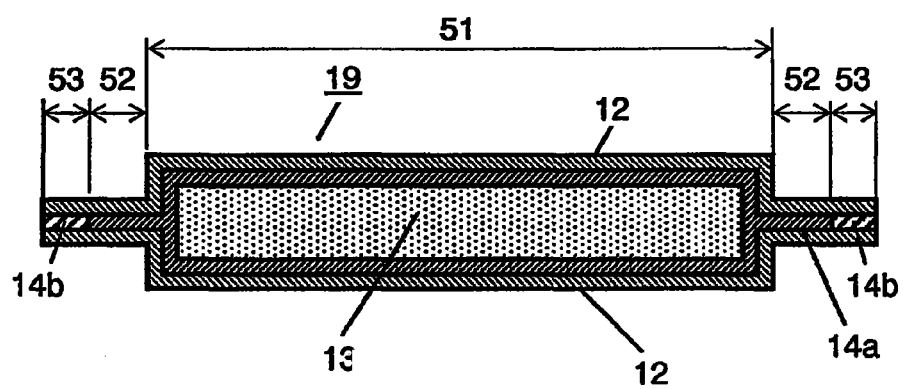
FIG. 4 shows a sectional view of a vacuum heat insulating material according to a second embodiment of the present invention.
Figure 5:
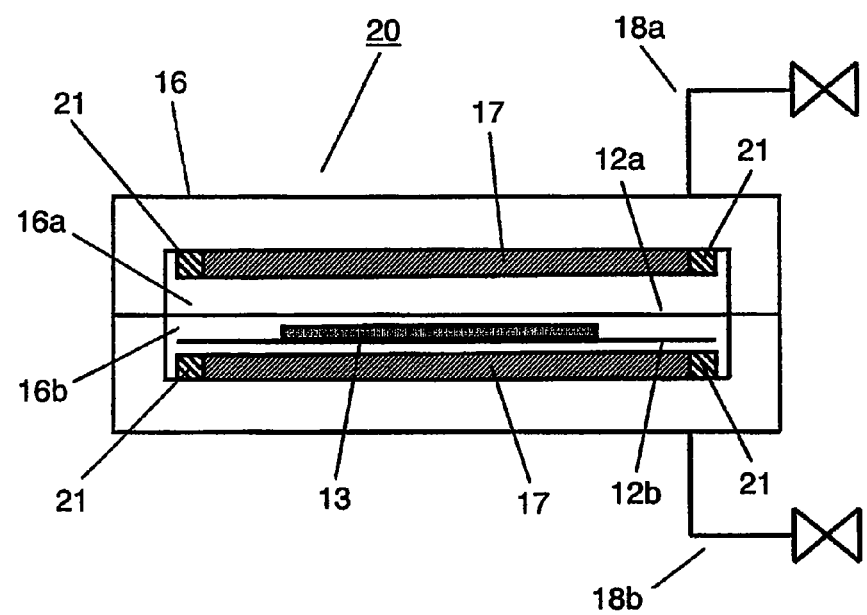
FIG. 5 shows a schematic sectional view of a production device for producing the vacuum heat insulating material according to the second embodiment of the present invention.

FIG. 4 shows a sectional view of a vacuum heat insulating material according to a second embodiment of the present invention. FIG. 5 is a schematic sectional view of a production device for producing the vacuum heat insulating material. Vacuum heat insulating material 19 is made of the same materials as vacuum heat insulating material 11 of the first embodiment. In FIG. 4, vacuum heat insulating material 19 has core member 13 and two envelope members 12 which cover core member 13 and inside of envelope members 12 is kept vacuum. Envelope members 12 have first portion 51 which faces the core member; second portions 52 which are in the vicinity of the core member; and third portions 53 which are outside second portions 52. First portion 51, second portions 52, and third portions 53 are unitary formed.

Envelope member 12 include heat-seal layer 14a and heat-seal layer 14b, and heat-seal layer 14a is heat sealed along core member 13. Heat-seal layers 14a and 14b of top and bottom envelope members 12 are integrally heat sealed to each other. Heat-seal layers 14a and heat-seal layers 14b are different in thickness from each other, and heat-seal layers 14b seal the peripheries of envelope members 12. Vacuum heat insulating material 19 is produced by using production device 20 shown in FIG. 5. Production device 20 has top and bottom hot plates 17 and frame seal heaters 21 which heat seal the peripheries of envelope members 12 in chamber 16. Production device 20 is connected to top pipe 18a and bottom pipe 18b which are used to create or release the vacuum.

Envelope members 12a and 12b, and core member 13 are placed in production device 20. Chamber 16 is divided into two spaces 16a and 16b by envelope members 12a. Envelope members 12 are heated by top and bottom hot plates 17, and chamber 16 is evacuated through pipes 18a and 18b. When chamber 16 reaches a predetermined degree of vacuum, frame seal heaters 21 seal the peripheries of envelope members 12 that correspond to third portions 53. Pipe 18a releases the vacuum only in chamber 16a first, and then the vacuum in chamber 16b is released so as to introduce the atmosphere. In this atmospheric introduction process, a pressure difference occurs between inside and outside vacuum heat insulating material 19, and envelope members 12a and 12b become into contact with each other so as to be heat sealed along core member 13. Such a control of atmospheric introduction improves sealing quality.

As described above, vacuum heat insulating material 19 has different surface conditions between the peripheries and the inner sides of envelope members 12. The peripheries correspond to third portions 53, and the inner sides correspond to first portion 51 and second portions 52. The gas pressure is generated by the pressure difference between inside and outside vacuum heat insulating material 19, and the external pressure is the atmospheric pressure. Therefore, there is no need to provide a pressuring device, thereby vacuum heat insulating material 19 can easily be provided.

In vacuum heat insulating material 19, envelope members 12 have gas-barrier properties and each include heat-seal layer 14a and heat-seal layer 14b, and core member 13 is disposed between heat-seal layers 14a opposed to each other and heat-seal layers 14b opposed to each other. The entire envelope members 12 are heated to a temperature at which heat-seal layers 14a and 14b are melted. Opposed heat-seal layers 14b in the peripheries of envelope members 12 are heat sealed to each other by frame seal heaters 21. Then, opposed heat-seal layers 14a are heat sealed to each other by applying uniform pressure to the entire envelope members 12 from outside to inside envelope members 12.

In vacuum heat insulating material 19 of the present embodiment, envelope members 12 have gas-barrier properties and include heat-seal layers 14a and heat-seal layers 14b, and core member 13 is sealed under reduced pressure between heat-seal layers 14a opposed to each other and heat-seal layer 14b opposed to each other. The entire envelope members 12 are heated to the temperature at which heat-seal layers 14a and 14b are melted. Opposed heat-seal layers 14b in the peripheries of envelope members 12 are heat sealed to each other by frame seal heaters 21. Then, opposed heat-seal layers 14a are heat sealed to each other by applying the uniform pressure from outside to inside envelope members 12 to the entire envelope members 12.

In vacuum heat insulating material 19 of the present embodiment having the aforementioned structure, opposed heat-seal layers 14b positioned at the peripheries of envelope members 12, that is, at third portions 53 are heat sealed to each other by frame seal heaters 21. Then, opposed heat-seal layers 14a are heat sealed to each other by applying the uniform pressure to entire envelope members 12 from outside to inside envelope members 12 throughout first portion 51 and second portion 52 of envelope members 12. Consequently, even when core member 13 has a comparatively large thickness exceeding 10 millimeters, the predetermined pressure can be applied to the portions of envelope members 12 that do not have core member 13 therebetween, without compressing core member 13 too much. The aforementioned portions indicate where heat-seal layers 14a are to be heat sealed to each other and heat-seal layers 14b are to be heat sealed to each other. This ensures the heat sealing.

Consequently, even when core member 13 has a comparatively large thickness, vacuum heat insulating material 19 is prevented from suffering winkles in the vicinity of core member 13, so that the portions of envelope members 12 that are in contact with each other can be securely heat sealed by the atmospheric pressure. The heat sealed region can be extended as far as the edges of core member 13 so as to improve sealing performance. The heat sealed portions where opposed heat-seal layers 14a are heat sealed to each other have homogeneous quality and reliability. As a result, vacuum heat insulating material 19 having long-term reliability can be provided.

In the present embodiment, the pressure applied for the heat sealing of heat-seal layers 14a is a fluid pressure. Using a fluid facilitates the application of the uniform pressure to the entire envelope members 12. The pressure for the heat sealing of heat-seal layers 14a is directly applied by the fluid, without stressing or scratching envelope members 12. As a result, vacuum heat insulating material 19 with reduced occurrences of pinholes and other similar problems can be provided.

In the present embodiment, the fluid is a gas. A gas is easier to handle and has less adverse effects on envelope members 12 than a liquid, which requires after-treatment such as removal of the liquid from envelope members 12 when adhered thereto. The pressure applied by the gas in the present embodiment is atmospheric pressure. The atmospheric pressure can be uniformly applied from outside to inside envelope members 12 to the entire envelope members 12 by covering core member 13 with envelope members 12 in a space reduced in pressure substantially to vacuum and then only by returning the reduced pressure space to normal pressure. The atmospheric pressure is high enough for the heat-sealing, so that there is no need to provide a pressuring device. This simplifies the provision of vacuum heat insulating material 19.

Heat-seal layers 14a and 14b are made of polyethylene. Since polyethylene can be sealed at comparatively low temperature, it becomes easier to perform the heat sealing by additional heating. As a result, vacuum heat insulating material 19 can be provided at low cost. Furthermore, envelope members 12 each have protective layer (not shown) of polyethylene terephthalate as the outermost layer. Providing envelope members 12 with the outermost layers made of a material suitable for surface protection can improve scratch resistance and pierce resistance so as to reduce pinholes and other similar problems. As a result, vacuum heat insulating material 19 having long-term reliability can be provided. Polyethylene terephthalate is inexpensive, so that vacuum heat insulating material 19 can be provided at low cost.

In the case where the heat for the heat sealing of heat-seal layers 14a is applied out of contact with envelope members 12, there is no need to use the hot plates or the like that fit the shape of core member 13. In addition, envelope members 12 have no stress due to creases or scratches and are reduced in occurrence of pinholes and other similar problems. In the case where the heating for the heat sealing of heat-seal layers 14a is applied by radiant heat from hot plates 17, heat-seal layers 14a can be heated out of contact with hot plates 17 and also in a reduced pressure space. Although vacuum heat insulating material 19 of the present embodiment does not include an absorbent, it can include it.

Third Embodiment

Figure 6:
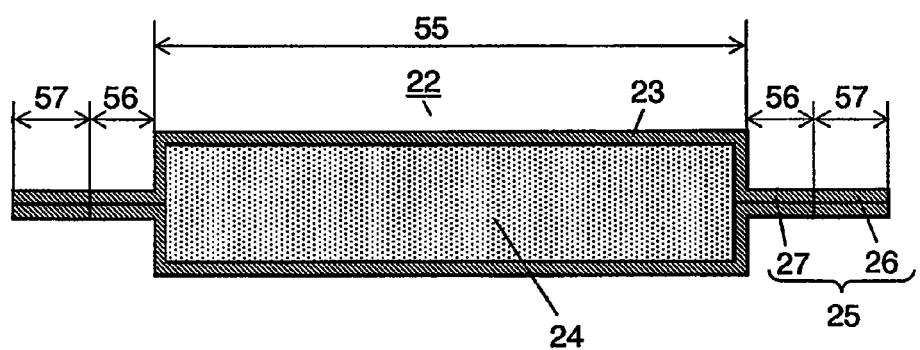
FIG. 6 shows a sectional view of a vacuum heat insulating material according to a third embodiment of the present invention.

FIG. 6 shows a sectional view of a vacuum heat insulating material according to a third embodiment of the present invention. In FIG. 6, vacuum heat insulating material 22 has core member 24 and two envelope members 23 which cover core member 24 and inside of envelope members 23 is kept vacuum. Envelope members 23 have first portion 55 which faces the core member, second portions 56 which are in the vicinity of the core member, and third portions 57 which are outside second portions 56. First portion 55, second portions 56, and third portions 57 are unitary formed.

Vacuum heat insulating material 22 has peripheral fin 25 consisting of sealing portion 26 and secured sealing portion 27. Envelope members 23 are heat sealed to each other by the ordinary method in sealing portions 26 and by additional heating in secured sealing portions 27. In other words, secured sealing portions 27 and sealing portions 26 correspond to second portions 56 and third portions 57, respectively, of envelope member 23.

Envelope members 23 have the same structure as envelope members 12 of vacuum heat insulating material 11 of the first embodiment shown in FIG. 2. Envelope member 23 is made of a laminate film consisting of first protective layer 28, second protective layer 29, gas barrier layer 30, and heat-seal layer 14 in this order from outside to inside. Two laminate films are opposite to each other. First protective layers 28 are made of polyethylene terephthalate film, and second protective layers 29 are made of nylon film. Gas barrier layer 30 is made of aluminum foil, and heat-seal layer 14 is made of very low density polyethylene (VLDPE) film, which is a kind of polyethylene. The polyethylene terephthalate film is 12 µm thick, the nylon film is 15 µm thick, the aluminum foil is 6 µm thick, and the very low density polyethylene (VLDPE) film is 50 µm thick.

A method of producing vacuum heat insulating material 22 is described as follows with reference to FIG. 6.

Core member 24 is a glass wool board having a density of 275 kg/m³ and dried for one hour at 140° C. in a drying furnace. Envelope members 23 are previously sealed at three sides to form a bag-shape. Then, core member 24 is inserted into the bag-shape envelope member 23 under a pressure reduced almost to a vacuum (10 pascals, for example). The opening of envelope member 23 is pressed by hot plates so as to be sealed, thereby forming sealing portions 26. Then, envelope member 23 are taken out from the reduced pressure to obtain vacuum heat insulating material 22 that is the same as an ordinary vacuum heat insulating material. Peripheral fin 25, at this moment, have been pressed to contact each other by the atmospheric pressure, and includes sealing portion 26 and secured sealing portions 27 that have not been sealed yet.

Next, in order to additionally heat vacuum heat insulating material 22, vacuum heat insulating material 22 is passed between top and bottom heaters so that the heat-seal layers in secured sealing portions 27 can reach their melting temperature. At this moment, envelope members 23 are heated by radiant heat from the heaters and the ambient temperature. Then, envelope members 23 is immediately cooled under the atmospheric pressure to produce vacuum heat insulating material 22, in which the entire envelope members including secured sealing portions 27 are heat sealed.

As described above, heat-seal sealing portions 26 of peripheral fins 25 are heat sealed to each other first by heating the entire envelope members 23, and then secured sealing portions 27, that is different with sealing portions 26, are heat sealed to each other. This increases the seal width so as to improve sealing performance, prevents wrinkles or sealing defects, and improves gas-barrier properties. As a result, the vacuum heat insulating material having long-term reliability can be provided.

The optimum temperature and duration of the additional heating can be arbitrary determined depending on the material and shape of the vacuum heat insulating material and the specification of the heaters. Sealing portions 26 are well heat sealed to each other by the atmospheric pressure. However, in order to protect the adhesion at sealing portions 26, that is sealed beforehand, it is preferable that sealing portions 26 are applied with an appropriate pressure.

In vacuum heat insulating material 22 of the present embodiment, core member 24 is covered with envelope members 23 that include gas barrier layer 30 and heat-seal layers 14. Inside of envelope members 23 are reduced in pressure and the peripheries of envelope members 23 are heat sealed to form sealing portions 26. The portions of envelope members 23 inside sealing portions 26 where envelope members 23 are in contact with each other are entirely heat sealed.

Consequently, the heat sealing can be performed as simply as the normal well-known heat sealing process without causing wrinkles or sealing defects. Furthermore, the heat-sealing is applied to secured sealing portions 27 where envelope members 23 used to be merely in contact with each other and not sealed to each other. This extends the region to be heat sealed so as to improve sealing performance. As a result, vacuum heat insulating material 22 having long-term reliability can be obtained.

Furthermore, the heating device apply the uniform pressure to the heat sealed portions inside sealing portions 26, that is, secured sealing portions 27, and secured sealing portions 27 have no traces of pressuring. As a result, envelope members 23 has no stress due to creases or scratches, thereby vacuum heat insulating material 22 with reduced occurrence of pinholes and other similar problems can be provided.

In the present embodiment, heat-seal layers 14 are made of polyethylene. Since polyethylene can be sealed at comparatively low temperature, it becomes easier to perform the heat sealing by additional heating. As a result, vacuum heat insulating material 22 can be provided at low cost. Furthermore, envelope member 23 have protective layer 28 of polyethylene terephthalate as the outermost layer. Providing envelope member 23 with the outermost layers made of a material suitable for surface protection can make envelope member 23 more resistant to scratch and pierce and reduces occurrence of pinholes and other similar problems. As a result, vacuum heat insulating material 22 having long-term reliability can be provided. Polyethylene terephthalate is inexpensive, so that vacuum heat insulating material 22 can be provided at low cost.

Vacuum heat insulating material 22 of the present embodiment is produced as follows: Core member 24 is covered with envelope members 23 including gas barrier layers 30 and heat-seal layers 14. Inside of envelope members 23 are reduced in pressure, the peripheries of envelope members 23 are heat sealed, and the non-sealed portions where envelope members 23 are merely in contact with each other and not heat sealed to each other are applied with heat sufficient to melt heat-seal layers 14. This method allows to heat seal the non-sealed portions of envelope members 23 that cannot be heat sealed by the ordinary method. In vacuum heat insulating material 22 thus produced, the portions of heat-seal layers 14 that are in contact with each other are entirely heat sealed to each other.

In the method of producing vacuum heat insulating material 22 of the present embodiment, the heat may be applied out of contact with secured sealing portions 27. This allows envelope members 23 to be heated without the hot plates or the like that fit the shape of core member 24. In addition, envelope members 23 have no stress due to creases or scratches and are reduced in occurrence of pinholes and other similar problems.

Fourth Embodiment

Figure 7:
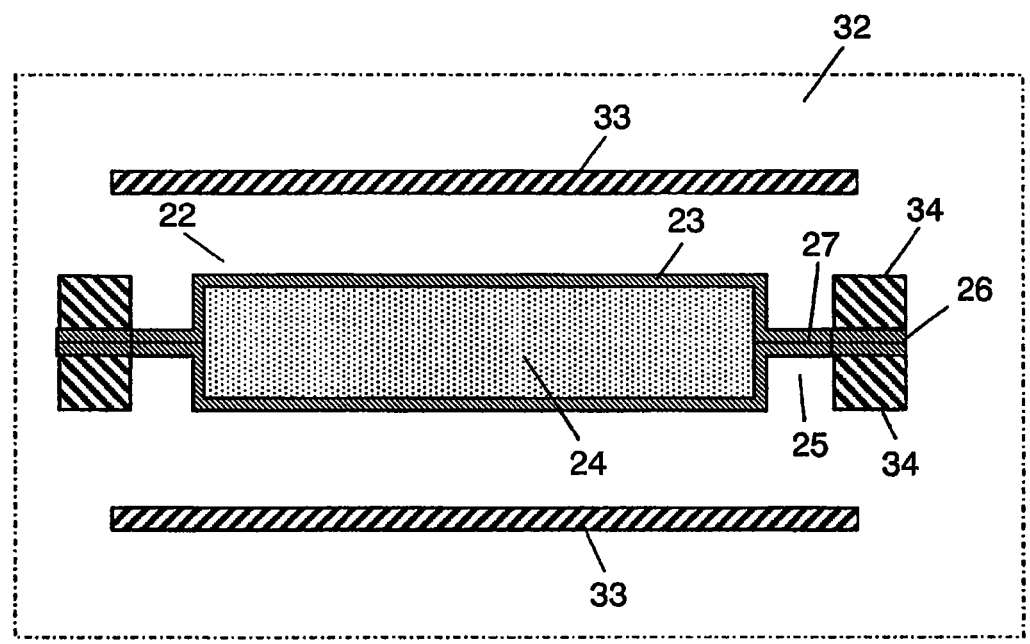
FIG. 7 shows a schematic sectional view of a production device for producing a vacuum heat insulating material according to a fourth embodiment of the present invention.

FIG. 7 is a schematic sectional view of a production device for producing a vacuum heat insulating material according to a fourth embodiment of the present invention. The method of producing a vacuum heat insulating material of the present embodiment is described as follows with reference to FIG. 7. Vacuum heat insulating material 22 is made of the same materials as vacuum heat insulating material 22 of the third embodiment, and has the same structure as vacuum heat insulating material 19 shown in FIG. 5. In reduced pressure space 32, top and bottom of core member 24 are covered with envelope members 23, whose peripheries are temporarily fixed to prevent misalignment between top and bottom envelope members 23. There are provided plane heaters 33 above and below envelope members 23. While maintaining the reduced pressure condition, plane heaters 33 are heated to keep the surfaces of envelope members 23 at 140° C. to 170° C. for 10 to 30 seconds, thereby melting the heat-seal layers of envelope members 23. At this moment, envelope members 23 are heated by radiant heat from plane heaters 33.

Next, the entire peripheries are bonded to each other between pressure plates 34 so as to form sealing portions 26, and then the reduced pressure space is returned to a normal temperature and normal pressure. As a result, secured sealing portions 27 of vacuum heat insulating material 22 are pressed and sealed at the same time by the atmospheric pressure so as to heat seal the entire peripheral fins 25. Thus, peripheral fins 25 are entirely heat sealed, so that none of the portions of the envelope members that are in contact with each other is left unsealed.

As described above, in vacuum heat insulating material 22 of the present embodiment, secured sealing portions 27 are heat sealed immediately after or almost at the same time as sealing portions 26 are heat sealed by heating the entire envelope members 23. This method prevents wrinkles or sealing defects so as to improve sealing performance and gas-barrier properties. As a result, the vacuum heat insulating material having long-term reliability can be provided. Furthermore, these sealing portions are heat sealed almost at the same time in the same space, so that it takes less time to produce vacuum heat insulating material 22.

Using the very low density polyethylene for heat-seal layers 14 can reduce the number of processes because it can be heat sealed at low temperatures. Using high-density polyethylene for heat-seal layers 14 can have a wider applicable temperature range of vacuum heat insulating material 22, and can further improve the gas-barrier properties.

In the method of producing vacuum heat insulating material 22 of the present embodiment, core member 24 is covered with envelope members 23 having gas barrier layers 30 and heat-seal layers 14 in reduced pressure space 32. Heat-seal layers 31 are brought to a predetermined molten state while maintaining reduced pressure space 32 to a temperature higher than the melting point of heat-seal layers 14. Reduced pressure space 32 is then returned to normal pressure, while pressing the peripheries of envelope members 23 so that envelope members 23 including the non-pressed portions can be heat sealed to each other. This method allows envelope members 23 to be normally heat sealed by heat pressing and to be heat sealed by the atmospheric pressure at the same time, so that it takes less time to produce the vacuum heat insulating material.

Fifth Embodiment

Figure 8:
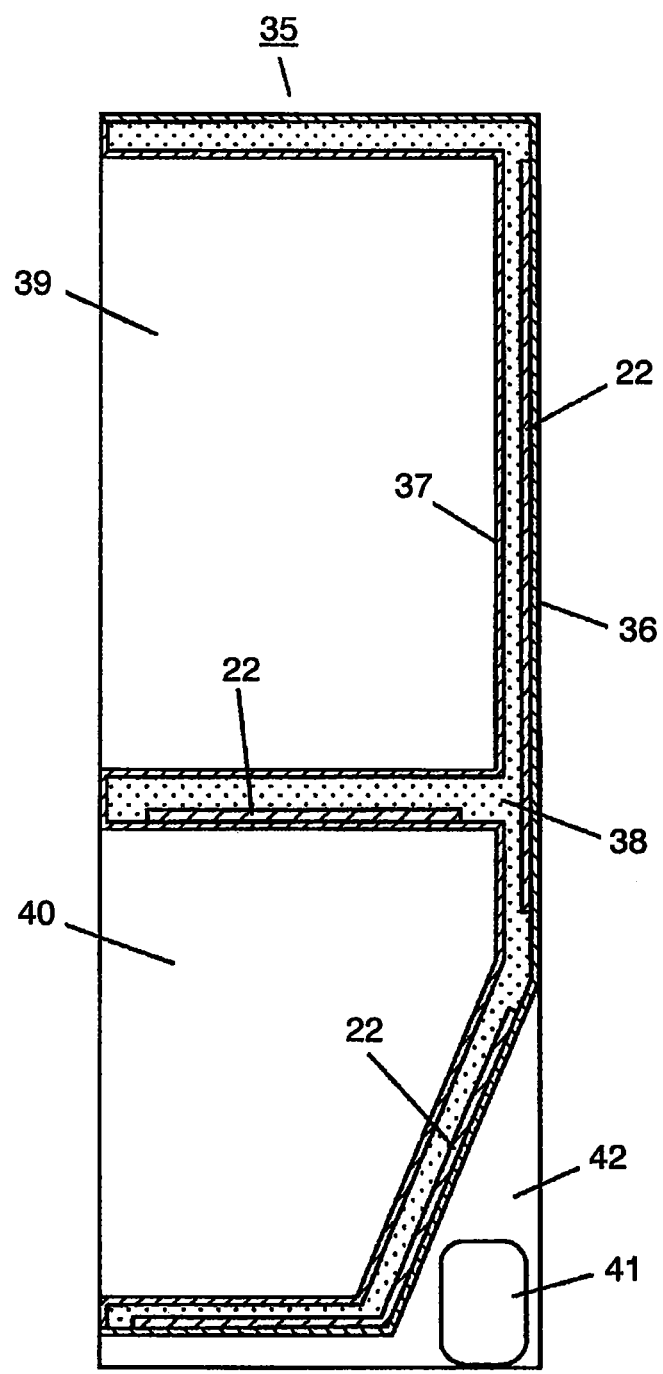
FIG. 8 shows a schematic sectional view of a refrigerator, which is a heat insulating box according to a fifth embodiment of the present invention.
Figure 9:
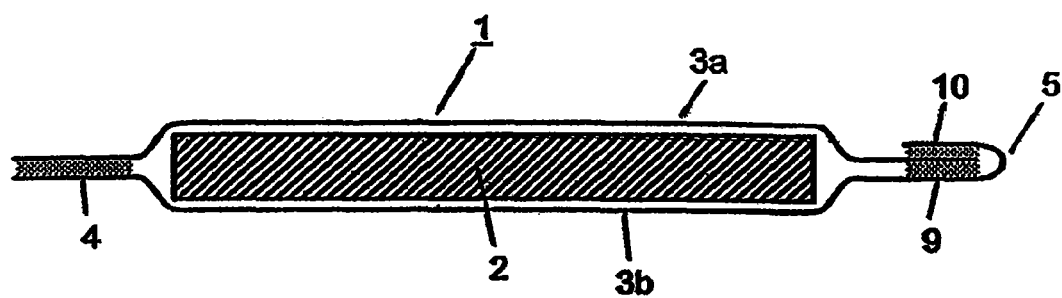
FIG. 9 shows a sectional view of a conventional vacuum heat insulating material.
Figure 10:
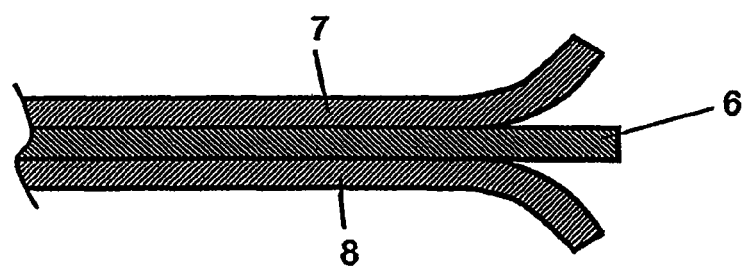
FIG. 10 is an enlarged sectional view of an envelope member as a component of the conventional vacuum heat insulating material.

FIG. 8 is a schematic sectional view of a refrigerator main body as a heat insulating box according to a fifth embodiment of the present invention. In refrigerator main body 35, which is a heat insulating box, outer box 36 made of a steel plate and inner box 37 made of ABS resin form a space therebetween. The space is provided on one side thereof with vacuum heat insulating material 22, and the remaining space is filled with foam insulation material 38 made of rigid urethane foam. Refrigerator main body 35 includes refrigerating room 39, freezing room 40, and machine room 42 having compressor 41 therein.

The refrigerator, that is the heat insulating box, of the present embodiment maintains energy-saving performance for a long time by using vacuum heat insulating material 22 with long-term reliability. The long-term reliability has been achieved by making vacuum heat insulating material 22 high in gas-barrier properties and resistant to scratch and pierce and reduced in occurrence of pinholes and other similar problems. The power consumption of the refrigerator is measured and it has turned out to be about 20% lower than that of the refrigerators not having vacuum heat insulating material 22. Using vacuum heat insulating material 11 of the first embodiment or vacuum heat insulating material 19 of the second embodiment can provide the same advantages as using vacuum heat insulating material 22.

As described above, in the vacuum heat insulating material of the present invention, the region to be heat sealed is extended as far as the edges of the core member so as to improve sealing performance even when a core member having a comparative large thickness is used. The heat-seal layers are made of material suitable for heat sealing, and the surface protective layer is made of a material suitable for surface protection. This makes the vacuum heat insulating material higher in resistance to scratch and pierce and reduces an occurrence of pinholes and other similar problems. As a result, the vacuum heat insulating material has long-term reliability. Furthermore, a heat insulating box such as an energy-saving refrigerator that uses the vacuum heat insulating material can be provided.

Although the fluid used in the aforementioned first to fourth embodiments is atmospheric air, however, the fluid used in the present invention may be carbon dioxide, helium, or the like.

INDUSTRIAL APPLICABILITY

As described above, the vacuum heat insulating material of the present invention has been improved in gas-barrier properties, resistance to scratch and pierce, and reduction in occurrence of pinholes and other similar problems. These advantages allow the vacuum heat insulating material to have a deep groove, to be used in an environment subjected to external impact, or to be used in a heat insulating box such as a refrigerator and other low temperature devices.

The invention claimed is:

1. A method of producing a vacuum heat insulating material, the method comprising:
    covering a core member with envelope members, each of the envelope members having a gas barrier layer and a heat-seal layer, wherein the envelope members are opposed to each other in such a manner to form an inside within which the core member is disposed,
    evacuating the inside of the envelope members; and subsequently
    first melting and sealing for heat sealing only the peripheries of the envelope members to provide heat-sealed peripheries by uniformly applying heat to the entire envelope members sufficient to melt the heat-seal layer, and
    second melting and sealing to melt and seal the heat-seal layer by uniformly applying heat and pressure from outside to inside the envelope members to the entire envelope members by introducing an atmosphere outside the envelope members having a higher pressure than the inside of the envelope members, wherein the heat is applied out of contact with the envelope members, and
    wherein heat sealing occurs a) where the envelope members are in contact with each other, and b) inside the heat-sealed peripheries, forming a heat sealed portion extending as far as the edges of the core member.

2. The method of producing a vacuum heat insulating material of claim 1, wherein
    the heat is applied by radiant heat from a heater.

3. A method of producing a vacuum heat insulating material, the method comprising:
    reducing pressure in a space around envelope members with a core member placed inside the envelope members, each of the envelope members being a laminated film having a gas barrier property and a heat-seal layer inside thereof; and
    first melting and sealing by applying sufficient heat, to only the peripheries of the envelope members, to melt and seal the heat-seal layer, and
    second melting and sealing to form a heat sealed portion of the envelope members extending as far as the edges of the core member by making an outer pressure of the sealed enveloping members to be an atmospheric pressure so as to make portions of the envelope members contact with each other by a difference of pressure between an inner pressure and the outer pressure of the envelope members, the portions of the envelope members being portions located where no core member is placed between the envelope members.

4. The method of producing a vacuum heat insulating material of claim 3, wherein
    the sealing envelope members in a reduced pressure space with a core member placed inside the envelope members comprises heat sealing an opening of a bag-shape envelope member with a core member inserted therein.

5. The method of producing a vacuum heat insulating material of claim 3, wherein
    the heat sealed portion comprising only peripheries of the envelope members comprises heat sealing peripheries of two envelope members covering the core member.

6. The method of producing a vacuum heat insulating material of claim 3, wherein
reducing pressure and forming a heat seal is performed in a chamber capable of being evacuated.

7. The method of producing a vacuum heat insulating material of claim 4, wherein
reducing pressure and forming a heat seal is performed in a chamber capable of being evacuated.

8. The method of producing a vacuum heat insulating material of claim 5, wherein
reducing pressure and forming a heat seal is performed in a chamber capable of being evacuated.

9. The method of producing a vacuum heat insulating material of claim 6, wherein
the sufficient heat to melt the heat-seal layer is applied before the portions of the envelope members being located where no core member is placed between the envelope members are made to come in contact with each other.

10. The method of producing a vacuum heat insulating material of claim 3, wherein
the outer pressure of the envelope members is made to be atmospheric pressure by removing the sealed envelope members from the reduced pressure space.

11. The method of producing a vacuum heat insulating material of claim 3, wherein
the sufficient heat to melt the heat-seal layer is a radiation heat from a heater and an environmental temperature.

12. The method of producing a vacuum heat insulating material of claim 3, wherein
the sufficient heat to melt the heat-seal layer heats an entire envelope member.

13. A method of producing a vacuum heat insulating material, the method comprising:
covering a core member with envelope members, each of the envelope members having a gas barrier layer and a heat-seal layer,
evacuating an inside of the envelope members; and
first melting and sealing by uniformly applying heat sufficient to melt and seal the heat-seal layer, and
second melting and heat sealing of the envelope members where the envelope members are in contact with each other by introducing an atmosphere outside the envelope members having a higher pressure than the inside of the envelope members, forming a heat sealed portion extending as far as the edges of the core member.

14. A method of producing a vacuum heat insulating material,
the method comprising:
heat-sealing a non-sealed portion of a vacuum heat insulating material by applying a sufficient heat out of contact to the non-sealed portion, to melt a heat seal layer of envelope members comprising the vacuum heat insulating material and by contacting the envelope members with each other by applying atmospheric pressure to the envelope members, wherein
the vacuum heat insulating material comprises:
a core member covered with the envelope members, the envelope member being a gas barrier laminated film with the heat-seal layer disposed on an inner side of the envelope member, and the inner side of the envelope members being evacuated;
a sealed portion where only an entire outer periphery of a peripheral fin of envelope members is heat-sealed by the method; and
the non-sealed portion where the envelope members are not heat-sealed and not in contact with each other by atmospheric pressure, the non-sealed portion being an inner periphery of the sealed portion;
the heat-sealing comprising a first heat-sealing to heat-seal the entire outer periphery of the peripheral fin of the envelope member and a second heat-sealing to form a heat sealed portion extending as far as the edges of the core member.

15. A method of producing a vacuum heat insulating material,
the method comprising:
inserting a core member into an envelope member having a bag-shape, the envelope member comprising laminate films sealed on three sides having gas barrier property and including inner heat-seal layers;
pressing an opening of the envelope member by a heater in a reduced pressure space, followed by taking the envelope member out of the reduced pressure space, the envelope member having a sealed portion where an entire outer periphery of a peripheral fin of the envelope member is heat-sealed; and
heat-sealing a non-sealed portion of the envelope member by applying a sufficient heat out of contact to the non-sealed portion, to melt the inner heat seal layers of the envelope member and by contacting the inner heat-seal layers with an atmospheric pressure to seal only an inner periphery of the sealed portion of the peripheral fin of the envelope member extending as far as the edges of the core member.

16. The method of producing a vacuum heat insulating material of claim 13, wherein
the envelope member is heated by a radiant heat from a heater when the non-sealed portion is heat-sealed.

17. The method of producing a vacuum heat insulating material of claim 14, wherein
the envelope member is heated by a radiant heat from a heater when the non-sealed portion is heat-sealed.

18. The method of producing a vacuum heat insulating material of claim 13, wherein
the entire envelope member is heated when the non-sealed portion is heat-sealed.

19. The method of producing a vacuum heat insulating material of claim 14, wherein
the entire envelope member is heated when the non-sealed portion is heat-sealed.

* * * * *